United States Patent
Maddox

(10) Patent No.: US 9,139,943 B2
(45) Date of Patent: Sep. 22, 2015

(54) DRIVE LINK SYSTEM AND TUFTING MACHINES COMPRISING SAME

(71) Applicant: Shaw Industries Group, Inc., Dalton, GA (US)

(72) Inventor: David R. Maddox, Ringgold, GA (US)

(73) Assignee: Columbia Insurance Company, Omaha, NE (US)

( * ) Notice: Subject to any disclaimer, the term of this patent is extended or adjusted under 35 U.S.C. 154(b) by 1 day.

(21) Appl. No.: 14/202,179

(22) Filed: Mar. 10, 2014

(65) Prior Publication Data

US 2014/0260797 A1    Sep. 18, 2014

Related U.S. Application Data

(60) Provisional application No. 61/784,087, filed on Mar. 14, 2013.

(51) Int. Cl.
*D05C 15/22* (2006.01)
*F16H 21/44* (2006.01)

(52) U.S. Cl.
CPC ............ *D05C 15/22* (2013.01); *F16H 21/44* (2013.01); *Y10T 74/18888* (2013.01)

(58) Field of Classification Search
CPC ........ D05C 15/04; D05C 15/08; D05C 15/10; D05C 15/12; D05C 15/22; D05C 15/24; D05C 15/32; D05C 15/34; D05C 15/36; F16H 21/44
USPC ............ 112/80.32, 80.4, 80.45, 80.51, 80.52, 112/80.54, 80.56
See application file for complete search history.

(56) References Cited

U.S. PATENT DOCUMENTS

| | | | | |
|---|---|---|---|---|
| 2,990,792 A | * | 7/1961 | Nowicki et al. | 112/80.52 |
| 3,919,953 A | * | 11/1975 | Card et al. | 112/80.45 |
| 4,375,196 A | * | 3/1983 | Beasley | 112/80.6 |
| 4,499,449 A | * | 2/1985 | Shinozaki et al. | 338/32 R |
| 4,754,718 A | * | 7/1988 | Watkins | 112/80.52 |
| 4,800,828 A | * | 1/1989 | Watkins | 112/80.41 |
| 4,867,080 A | | 9/1989 | Taylor | 112/80.32 |
| 4,981,091 A | | 1/1991 | Taylor | 112/80.32 |
| 5,005,498 A | | 4/1991 | Taylor | 112/80.32 |
| 5,320,053 A | * | 6/1994 | Beasley | 112/80.42 |
| 5,513,586 A | * | 5/1996 | Neely et al. | 112/80.01 |
| 5,645,001 A | * | 7/1997 | Green et al. | 112/80.55 |
| 5,706,745 A | * | 1/1998 | Neely et al. | 112/80.55 |
| 2010/0132511 A1 | * | 6/2010 | Sutton | 81/3.2 |

OTHER PUBLICATIONS

U.S. Appl. No. 61/784,087, filed Mar. 14, 2013, David R. Maddox (Shaw Industries Group, Inc.).

* cited by examiner

*Primary Examiner* — Ismael Izaguirre
(74) *Attorney, Agent, or Firm* — Ballard Spahr LLP

(57) ABSTRACT

Implementation disclosed herein describe a drive link systems for use in a tufting machine. The drive link systems include a goose-neck, a rocker arm, and three drive links that impart increased rigidity to the connection between the goose-neck and the rocker arm. The drive link systems are provided without a lubrication system. The rocker arm and the drive links are formed of light-weight material.

15 Claims, 7 Drawing Sheets

DRIVE LINK SYSTEM AND TUFTING MACHINES COMPRISING SAME

CROSS REFERENCE TO RELATED APPLICATION

This application claims the benefit of the U.S. Provisional Application No. 61/784,087, filed Mar. 14, 2013, which is hereby incorporated herein by reference in its entirety.

BACKGROUND

1. Field

Implementations described herein relate generally to a tufting machine and, more specifically, to a drive link system for use in a tufting machine.

2. Related Art

Conventional tufting machines are provided with series of drive link systems for effecting movement of a looper or hook assembly to loop or hook the yarn as the yarn is cut. Each drive link system includes a cast steel rocker arm, a single steel drive link containing lubrication ports, needle bearings coupled to the drive link, a pair of dowel pins, and a goose neck. Due to this single-link design, conventional drive link systems have poor rigidity, and frequent adjustment is required to maintain a high level of production quality. Thus, if conventional tufting machines are not regularly adjusted, there is an increased likelihood that low-quality goods will be produced. Along with the adjustment of the tufting machine, the lubrication ports of the drive link must be refilled with oil or other lubrication. Additionally, the weight of the rocker arm and drive link cause high levels of vibration at high operating speeds, making it difficult to operate conventional tufting machines at the high speeds required for modern tufting operations.

Thus, there is a need in the pertinent art for drive link systems that have sufficient rigidity to reduce the frequency of tufting machine adjustments. There is a further need in the art for drive link systems that do not require repeated lubrication. There is still a further need in the art for drive link systems that are light enough to function with minimal vibration at the high machine speeds required for a wide range of tufting operations.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Described herein is a drive link system for use in a tufting machine. The drive link system includes a goose-neck, a rocker arm, a first pin, a second pin, and a plurality of drive links. The goose-neck can define first and second spaced projections, with each projection having an outer surface and an inner surface. The inner surfaces of the projections can cooperate to define a receiving space. The first and second projections each define a respective bore, with the respective bores of the first and second projections being substantially axially aligned.

The rocker arm can define first and second spaced projections, with each projection having an outer surface and an inner surface. The inner surfaces of the projections can cooperate to define a receiving space. The first and second projections each define a respective bore, with the respective bores of the first and second projections being substantially axially aligned. The first and second projections of the goose-neck can be positioned in substantial opposition to the first and second projections of the rocker arm.

The first pin can be configured for receipt within the bores of the first and second projections of the goose-neck. The second pin can be configured for receipt within the bores of the first and second projections of the rocker arm.

Each drive link of the plurality of drive links can define a pair of first and second spaced bores positioned on opposing first and second ends of the drive link. The plurality of drive links can comprise an inner drive link and first and second outer drive links.

The inner drive link can have its first end positioned within the receiving space of the goose-neck and its second end positioned within the receiving space of the rocker arm such that the first and second bores of the inner drive link are substantially axially aligned with the bores of the projections of the goose-neck and the rocker arm. The first bore of the inner drive link can be configured to receive the first pin, and the second bore of the inner drive link can be configured to receive the second pin.

The first outer drive link can be positioned substantially adjacent to the outer surfaces of the first projections of the goose-neck and the rocker arm such that the first and second bores of the first outer drive link are substantially axially aligned with the bores of the first projections of the goose-neck and the rocker arm. Similarly, the second outer drive link can be positioned substantially adjacent to the outer surfaces of the second projections of the goose-neck and the rocker arm such that the first and second bores of the second outer drive link are substantially axially aligned with the bores of the second projections of the goose-neck and the rocker arm. The first bores of the outer drive links can be configured to receive the first pin, while the second bores of the outer drive links can be configured to receive the second pin.

It is contemplated that the drive link system can also include a plurality of oil-impregnated bearings, with each bearing being received within a respective bore of a drive link of the plurality of drive links. Each bearing can be configured to receive a respective pin of the first and second pins.

It is further contemplated that at least one of the rocker arm and the plurality of drive links can comprise a light-weight metal, such as, for example and without limitation, aluminum.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE FIGURES

These and other features of the preferred embodiments of the invention will become more apparent in the detailed description in which reference is made to the appended drawings wherein:

FIG. 8A shows a side view of the rocker arm; FIG. 8B shows a top view of the first portion of the rocker arm; and FIG. 8C shows a top view of the second portion of the rocker arm.

DETAILED DESCRIPTION

Figure 1:
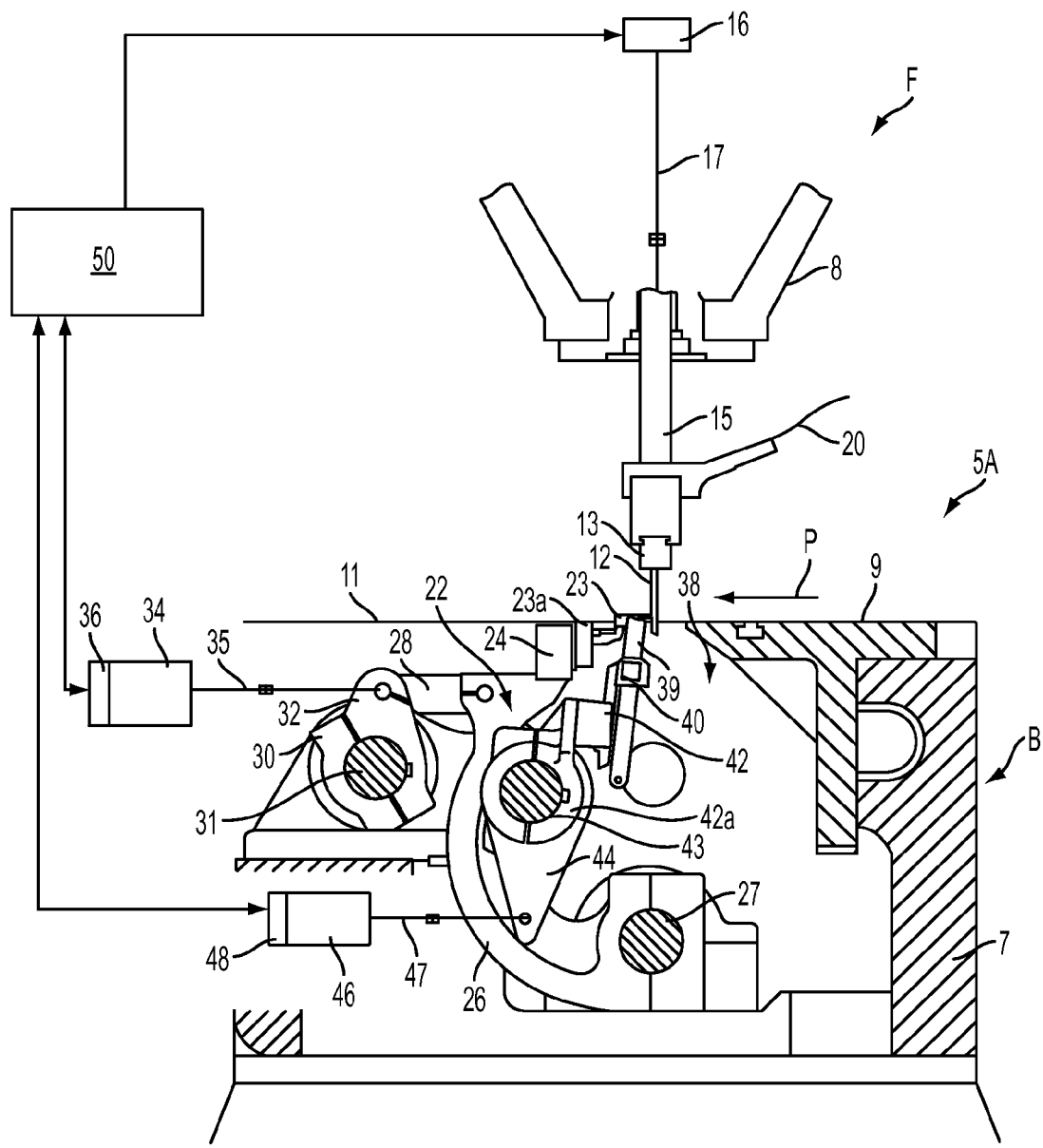
FIG. 1 is a partially cross-sectioned end elevational view of a tufting machine as is known in the art.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results described herein. It will also be apparent that some of the desired benefits described herein can be obtained by selecting some of the features described herein without utilizing other features. Accordingly, those who work in the art will recognize that many modifications and adaptations to the present invention are possible and can even be desirable in certain circumstances and are a part described herein. Thus, the following description is provided as illustrative of the principles described herein and not in limitation thereof.

In the following description, numerous specific details are set forth in order to provide a thorough understanding described herein. It will be obvious, however, to one skilled in the art that the present disclosure may be practiced without these specific details.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The word "or" as used herein means any one member of a particular list and also includes any combination of members of that list.

Reference will now be made to the drawings to describe various aspects of one or more implementations of the invention. It is to be understood that the drawings are diagrammatic and schematic representations of one or more implementations, and are not limiting of the present disclosure. Moreover, while various drawings are provided at a scale that is considered functional for one or more implementations, the drawings are not necessarily drawn to scale for all contemplated implementations. The drawings thus represent an exemplary scale, but no inference should be drawn from the drawings as to any required scale.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be predefined it is understood that each of these additional steps can be pre-defined with any specific aspect or combination of aspects of the disclosed methods.

Referring now to the drawings, in which like reference characters indicate like parts throughout the several views, numeral 5A in FIG. 1 refers to a tufting machine of a general type known to those skilled in the art. The tufting machine has a frame F which includes an upper section or head 8 spaced above a lower section or bed B over which a generally continuous backing material 11 is moved by one or more backing material feed rollers (not illustrated) of a type known to those skilled in the art. As is well known in the art, the bed section B of tufting machines generally includes a bed plate 7 and/or a bedrail 9. If the bed B includes a bedrail 9, the bedrail 9 can be selectively adjustable vertically to alter the pile height of the tufted product. Backing material 11 moves over the bed B in the path or direction of the arrow marked by the reference character "P".

The tufting machine includes an elongate series of spaced needles 12, although only one needle 12 is shown in FIG. 1. Each needle 12 is mounted to a needle bar 13. Needle bar 13 is supported for reciprocal motion so that the needles may be moved toward and away from backing material 11 in reciprocable fashion, and so that needles 12 reciprocably penetrate backing material 11 so that needle 12 cooperates with looper 23 and knife 39 for creating cut pile tufted articles. Needle bar 13 is mounted to at least one push rod 15, which is suitably journaled on head 8 for reciprocable motion toward and away from backing material 11. Push rod 15 extends toward and into operable engagement with a linear actuator 16.

Actuator 16 has an elongate actuator shaft 17, and is engaged with push rod 15 by conventional means, to include being threadably coupled or fastened, or by being linked by a pin, i.e. through a clevice arrangement or other pivotal pin arrangement, so that actuator 16, and in particular actuator shaft 17, can be disconnected from push rod 15. Actuator 16 includes a position feedback device, for example an encoder or linear transducer, for emitting a digital or an analog data position signal to a control processor or computing system 50, illustrated schematically in FIG. 1.

Figure 2:
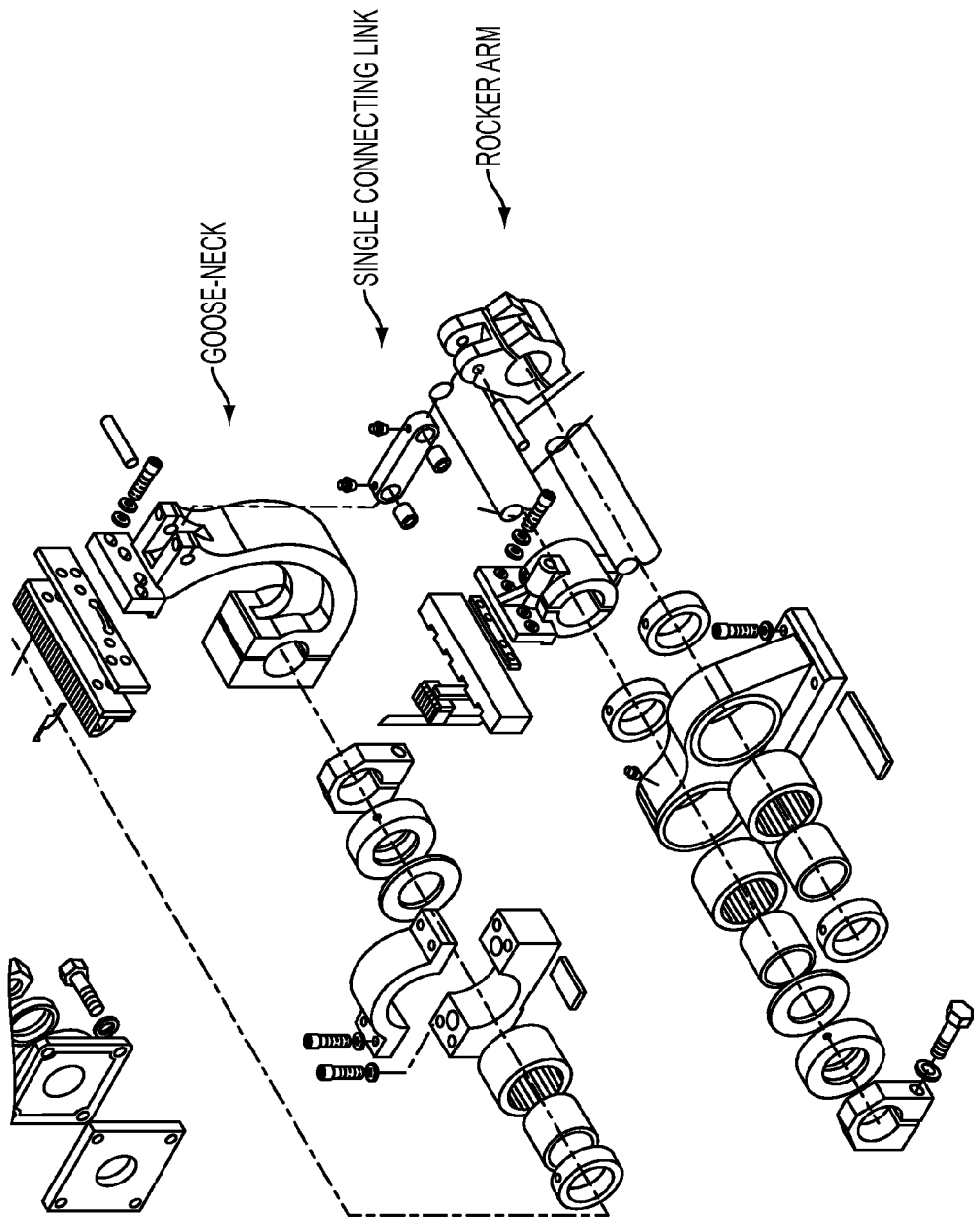
FIG. 2 is an exploded view of a tufting machine as is known in the art.

Positioned on frame F of the tufting machine is a cut pile looper or hook assembly 22, having a spaced, parallel series of loopers or hooks 23, the hooks being mounted to a hook block 23a, the hook block being fastened to a gauge bar 24 mounted, or carried on, a spaced series of goose-necks 26, one of which is shown in FIGS. 1-2. The goose-neck 26 has a pivot shaft 27 about which the goose-neck rotates in a partially circular motion. Hook assembly 22 includes an intermediate link 28 extending from goose-neck 26 to a rocker arm 30 clamped onto an elongate hook drive shaft 31 as known to those of skill in the art. Rocker arm 30 includes a lever 32 to which intermediate link 28 may be fastened, and to which the shaft of a second linear actuator 34 is also fastened for operating, i.e. rocking, drive shaft 31, and in turn rocking cut pile hook assembly 22 as is known in the art.

Actuator 34 includes in elongate actuator shaft 35 fastened to lever 32 in fashion similar to the manner in which actuator shaft or rod 17 is fastened to push rod 15. Actuator 34 also includes a position feedback device 36 for signaling the rotational position of the servo-motor (not illustrated) or the armature of the actuator, which in turn is translated into the linear position of actuator shaft 35 by the appropriate software program within control processor or computing system 50.

Tufting machine 5A of FIG. 1 also includes a knife assembly 38 which works in conjunction with hook assembly 22, and has a spaced, parallel series of knives 39 mounted on a mounting block assembly 40. Mounting block assembly 40 is fastened to a gauge bar 42, which is carried by a clamp 42a secured to an elongate knife drive shaft 43 in known fashion. Clamp 42a includes a lever 44 to which a third linear actuator 46 is attached. Actuator 46 has an elongate actuator shaft 47 fastened to lever 44 in fashion similar to the attachment of actuators 16 and 34 to push rod 15 and rocker arm 30, respectively. Actuator 46 also is provided with a position feedback device 48 which provides a position signal to control processor 50, in fashion similar to encoder 36.

Although only one actuator 16, 34, and 46 for push rod 15, cut pile hook assembly 22 and knife assembly 38, respectively, are shown, it is anticipated that a spaced series of actuators may be provided for reciprocating needle bar 13, for rocking looper drive shaft 31, and for rocking knife drive shaft 43. In this instance, the actuators would be spaced along the width of the tufting machine, it being understood by those of skill in the art that backing material 11 passes over the tufting machine from front to rear in the direction of path P as shown in FIG. 1. It also is understood by those of skill in the art that separate actuators 34 and 46 need not be provided for the cut pile hook assembly 22, and knife assembly 38, rather either a single actuator, or a spaced series of actuators, could operate both looper assembly 22 and knife assembly 38 by having the knife drive shaft 43 mechanically linked to looper drive shaft 31 so that one actuator, or a spaced series of actuators, can rock both shafts together in unison. However, and if desired, separate actuators can be provided as illustrated in FIG. 1, and described hereinabove.

Although not illustrated in FIG. 1, bedrail 9 can be adjusted and positioned by the use of the computer controlled tufting machine and process well known in the art and as generally disclosed in U.S. Pat. Nos. 4,867,080, 4,981,091,B1 4,981, 091, and 5,005,498 to Taylor, et al. Accordingly, control processor or computing system 50 illustrated in FIG. 1 also may be a part of the computer controlled tufting machine of the patents to Taylor, et al., such that it is integrated with the computer of the patents to Taylor, et al., to control all of the principal components of the tufting machine, including the reciprocation of needle bars 13, which carry needles 12 in respective rows, the rocking of looper drive shaft 31, knife drive shaft 43, and the lateral shifting of needle bars 13, all in unison with the control of the feed of yarns 20 to the tufting machine, the indexing of backing material 11 across the tufting machine, and the adjustment of bedrail 9. In this fashion, it is anticipated that the drive system could be used as a part of both a digitally controlled or analog controlled and "shaftless" tufting machine, that is which dispenses entirely with the known tufting machine main drive shaft to which the reciprocation of the needle bars, the lateral shifting of the needle bars with respect to one another and to the backing material, as well as the rocking of the loopers and knives has been mechanically linked.

Described herein with reference to FIGS. 3-8 are drive link systems and tufting machines that offer improved performance relative to conventional drive link systems and tufting machines, such as those described above and depicted in FIGS. 1-2. In exemplary aspects, it is contemplated that the drive link systems and tufting machines disclosed herein can optionally provide increased rigidity relative to conventional drive link systems and tufting machines, thereby decreasing the frequency at which machine adjustments are required. In additional exemplary aspects, it is contemplated that the drive link systems and tufting machines disclosed herein can optionally eliminate the need for repeated lubrication of drive links as is conventionally required. In further exemplary aspects, it is contemplated that the drive link systems and tufting machines disclosed herein can optionally decrease the weight of the rocker arm and/or drive pins such that the drive link system can function with minimal (if any) vibration at the high machine speeds required for a wide range of modern tufting operations. It is still further contemplated that the advantages discussed above can lead to a reduction in the carpet material waste that is typically associated with tufting operations. In particular, by improving the consistency of the drive link system (and tufting machine) and by reducing the vibrational forces within the tufting machine, it is contemplated that yarn stretching and yarn fatigue can be reduced.

In exemplary aspects, as depicted in FIGS. 3-8, the drive link system 100 disclosed herein can comprise a pair of pins 102, 103, a goose-neck 104, and a rocker arm 106. In these aspects, the goose-neck and the rocker arm can be configured to receive a respective pin of the pair of pins 102, 103. As further described herein, it is contemplated that the drive link system 100 can be configured to operatively couple the pin received by the goose-neck 104 to the pin received by the rocker arm 106 without the use of lubrication. For example, in exemplary aspects, it is contemplated that the drive link system can comprise a plurality of drive links 108. In these aspects, each drive link of the plurality of drive links 108 can define a pair of spaced bores 110, 111 positioned on opposing ends of the drive link. In further aspects, the drive link system can further comprise a plurality of oil-impregnated bearings 112. In these aspects, each bearing 112 can be received within a respective bore of a drive link of the plurality of drive links 108. It is contemplated that each bearing 112 of the plurality of brass bearings 112 can be configured to receive a respective pin of the pair of pins 102, 103. In additional exemplary aspects, it is contemplated that at least one of (a) the rocker arm and (b) the plurality of drive links 108 can comprise a light-weight material, such as, for example and without limitation, aluminum. In these aspects, it is further contemplated that the goose-neck can also comprise a light-weight material, such as, for example and without limitation, aluminum.

More particularly, in additional exemplary aspects, as depicted in FIGS. 3-8, the drive link system 100 disclosed herein can comprise a goose-neck 104, a rocker arm 106, a first pin 102, a second pin 103, and a plurality of drive links 108. In this aspect, the goose-neck can define first and second spaced projections 114, 115. It is contemplated that each of the first and second spaced projections can have an outer surface and an inner surface. In one aspect, the inner surfaces of the first and second projections of the goose-neck can cooperate to define a receiving space 116. In another aspect, the first and second projections can each define a respective bore. In this aspect, the respective bores of the first and second projections can be substantially axially aligned.

In an additional aspect, the rocker arm 106 of the drive link system 100 can define first and second spaced projections 118, 119. In this aspect, it is contemplated that each of the first and second projections can have an outer surface and an inner surface. It is further contemplated that the inner surfaces of the first and second projections can cooperate to define a receiving space 120. In a further aspect, the first and second projections can each define a respective bore. In this aspect, the respective bores of the first and second projections can be substantially axially aligned. In exemplary aspects, the first and second projections 114, 115 of the goose-neck can be positioned in substantial opposition to the first and second projections 118, 119 of the rocker arm.

In another aspect, the first pin 102 can be configured for receipt within the bores of the first and second projections 114, 115 of the goose-neck. In this aspect, it is contemplated that the second pin 103 can be configured for receipt within the bores of the first and second projections 118, 119 of the rocker arm 106. In a further aspect, each drive link of the plurality of drive links 108 can define a pair of first and second spaced bores 110, 111 positioned on opposing first and second ends of the drive link.

In additional aspects, the plurality of drive links 108 can comprise an inner drive link 108b and first and second outer drive links 108a, 108c. In these aspects, the inner drive link 108b can have its first end positioned within the receiving space of the goose-neck 104 and its second end positioned within the receiving space of the rocker arm 106 such that the first and second bores 110, 111 of the inner drive link 108b are substantially axially aligned with the bores of the projections of the goose-neck and the rocker arm. It is contemplated that the first bore 110 of the inner drive link 108b can be configured to receive the first pin 102. It is further contemplated that the second bore 111 of the inner drive link 108b can be configured to receive the second pin 103.

In further aspects, the first outer drive link 108a can be positioned substantially adjacent to the outer surfaces of the first projections of the goose-neck and the rocker arm 106 such that the first and second bores 110, 111 of the first outer drive link 108a are substantially axially aligned with the bores of the first projections of the goose-neck and the rocker arm. Similarly, it is contemplated that the second outer drive link 108c can be positioned substantially adjacent to the outer surfaces of the second projections of the goose-neck and the rocker arm such that the first and second bores 110, 111 of the second outer drive link 108c are substantially axially aligned with the bores of the second projections of the goose-neck and the rocker arm 106. It is further contemplated that the first bores 110 of the outer drive links can be configured to receive the first pin 102. It is still further contemplated that the second bores 111 of the outer drive links can be configured to receive the second pin 103. It is still further contemplated that it is unnecessary to position any wear-resistant components between the drive links and the respective projections of the goose-neck and rocker-arm.

In operation, it is contemplated that the plurality of drive links 108 can remain substantially parallel to one another, regardless of the speed at which the tufting machine operates. It is further contemplated that the spacing between the respective drive links can remain substantially constant.

Optionally, it is contemplated that the drive link system 100 can optionally comprise a plurality of bearings 112. It is contemplated that a respective bearing can be securely received within each bore defined by the plurality of drive links 108. It is further contemplated that each bearing 112 of the plurality of bearings 112 can be configured to receive a respective pin of the first and second pins 102, 103. In some exemplary aspects, it is contemplated that the plurality of bearings 112 can comprise a plurality of bearings 112 having an operative diameter of about 0.5 inches. However, it is contemplated that bearings 112 of any suitable size can be used.

Figure 6:
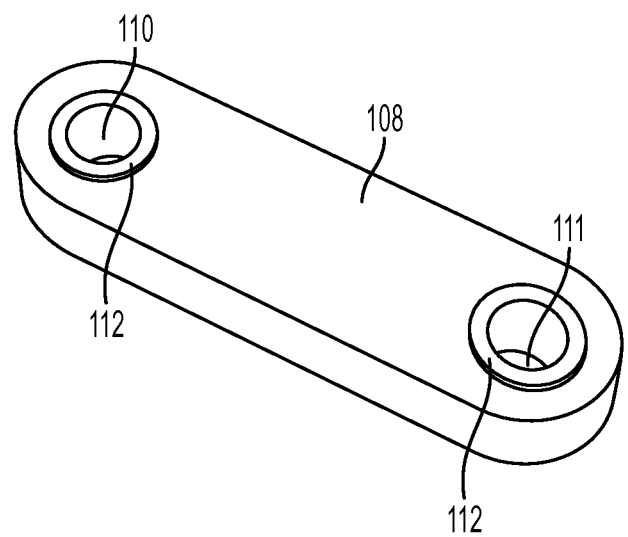
FIG. 6 depicts one implementation of a drive link having oil-impregnated bushings as described herein.
Figure 7:
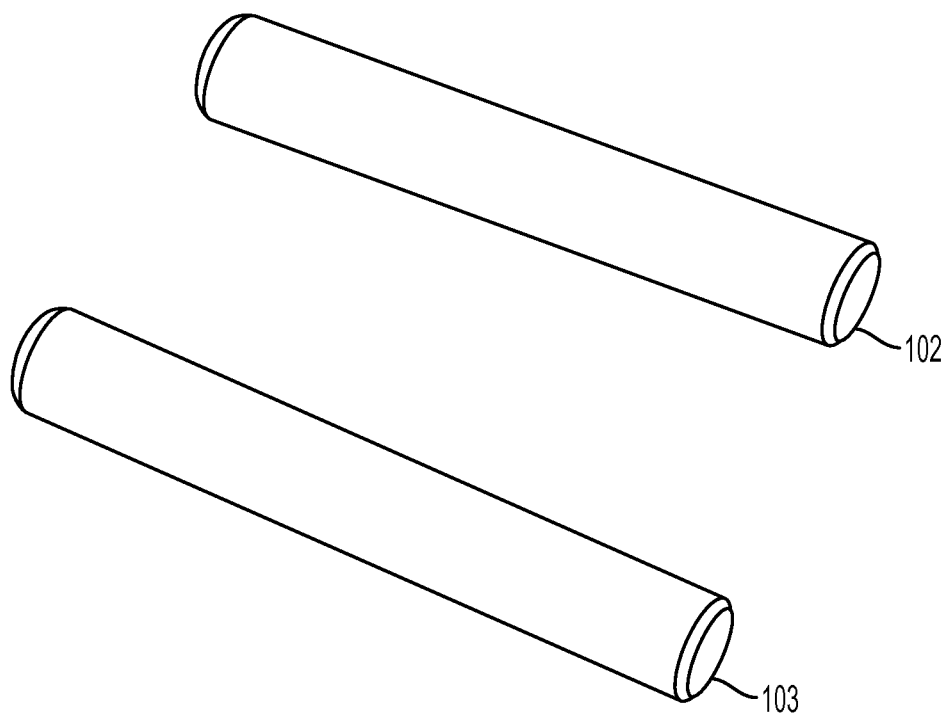
FIG. 7 depicts a perspective view of exemplary dowel pins for use with the drive link system described herein.

In exemplary aspects, as shown in FIG. 6, it is contemplated that the plurality of bearings 112 can comprise a plurality of oil-impregnated bearings 112. In these aspects, it is contemplated that the use of oil-impregnated bearings 112 can eliminate the need for manual lubrication of each drive link 108 as is required in conventional drive link systems. Thus, it is further contemplated that the plurality of drive links 108 do not require lubrication ports 122 as are typically required (See FIG. 5). Optionally, it is contemplated that the plurality of oil-impregnated bearings 112 can comprise a plurality of oil-impregnated brass bearings 112.

Figure 8C:
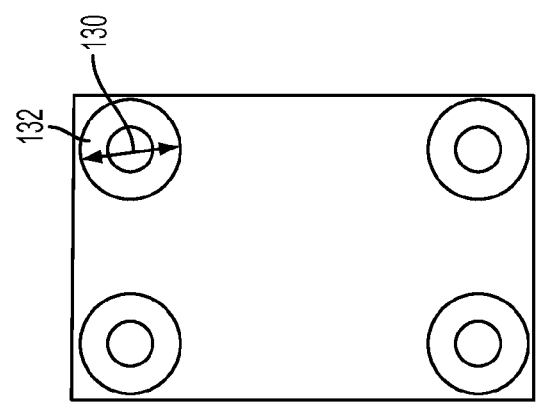
FIGS. 8A-8C depict an exemplary rocker arm of a drive link system as described herein.
Figure 8B:
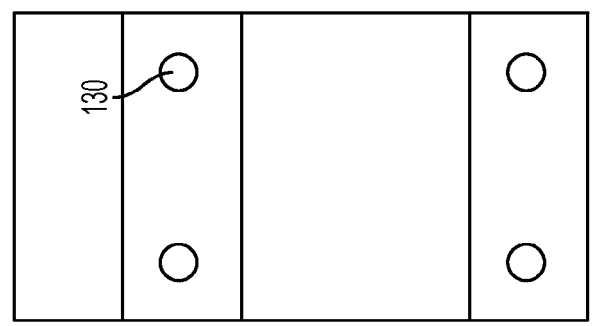
Figure 8A:
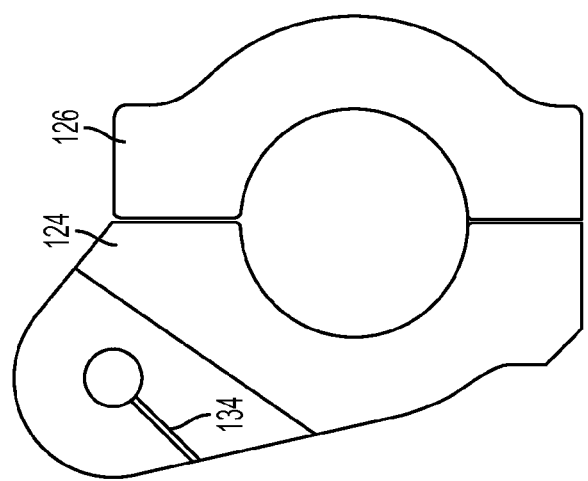

In additional exemplary aspects, and as shown in FIG. 8, it is contemplated that the bores defined by the goose-neck and the rocker arm 106 can be configured to receive the first and second pins 102, 103 through conventional clamping methods. In these aspects, it is contemplated that the goose-neck and the rocker arm can define respective slits 134 extending from an exterior surface of the goose-neck and/or rocker arm to a respective bore defined by the goose-neck and/or the rocker arm. In these aspects, it is contemplated that the bores and slits of the goose-neck and/or rocker arm can permit clamping of the pins within the bores using conventional methods.

Figure 3:
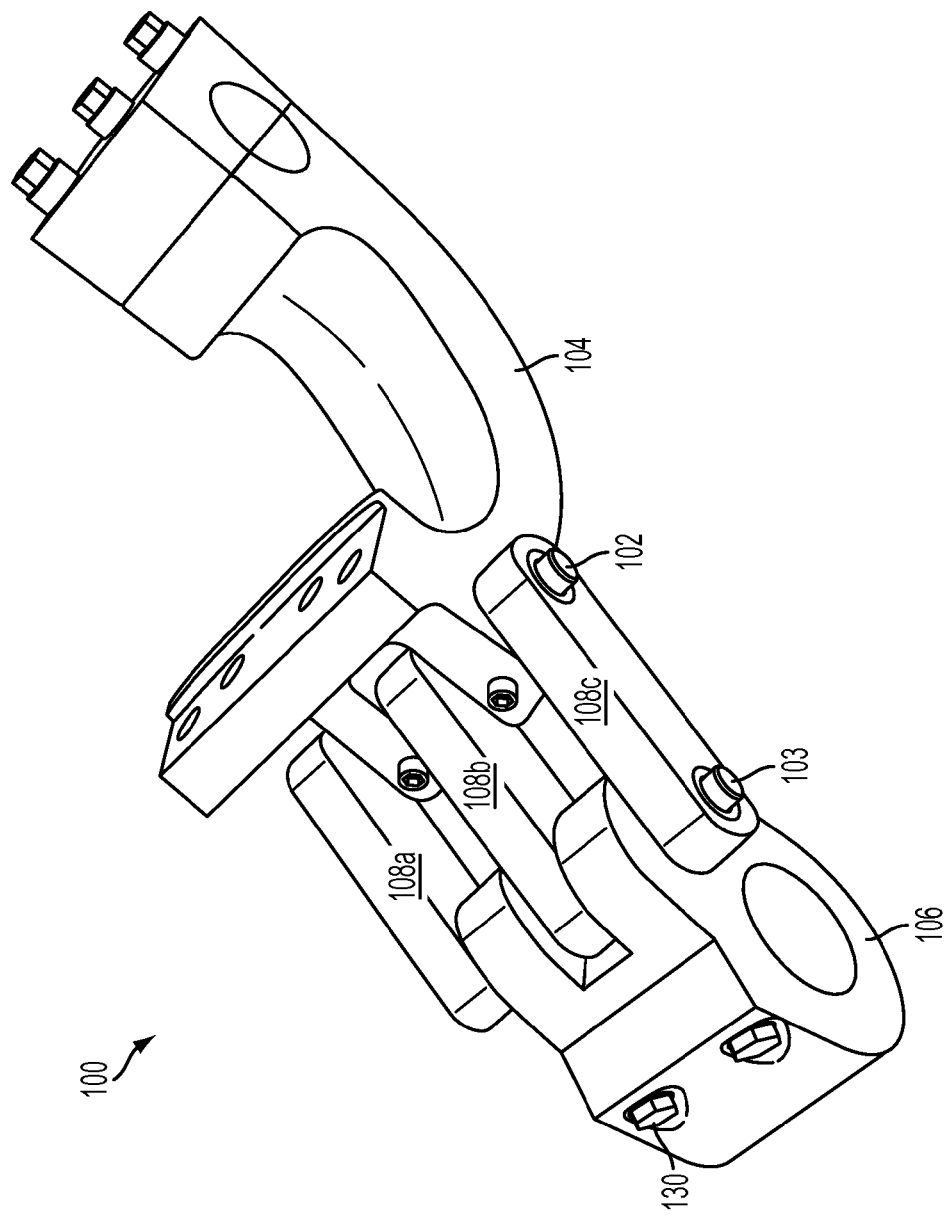
FIG. 3 is a top perspective view of an exemplary drive link system having three drive links as described herein.
Figure 4:
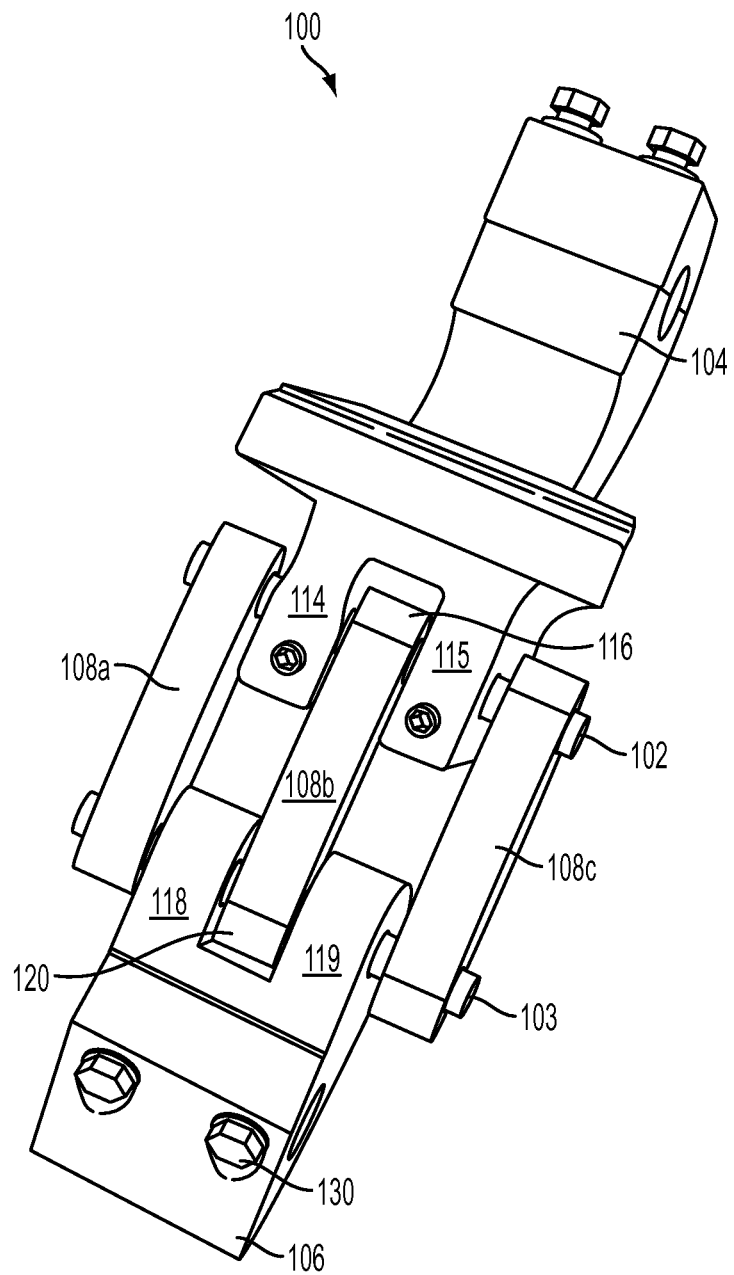
FIG. 4 is a bottom perspective view of an exemplary drive link system having three drive links as described herein.
Figure 5:
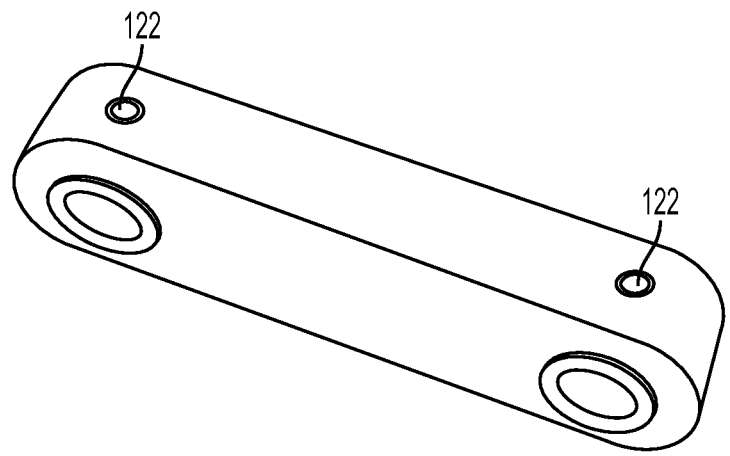
FIG. 5 depicts a conventional drive link having lubrication ports as is known in the art.

In other exemplary aspects, and as shown in FIGS. 3-4 and 8, the rocker arm 106 can be divided into a first portion 124 and a second portion 126, with the first portion comprising the first and second projections. In these aspects, it is contemplated that the first and second portions of the rocker arm can cooperate to define a plurality of transverse bores 130 extending through the first portion and into the second portion of the rocker arm, substantially transverse to the bores defined by the first and second projections. In exemplary aspects, it is contemplated that the plurality of bores can comprise four bores 130 spaced as shown in FIG. 8. In operation, the plurality of bores 130 can be configured to receive a plurality of corresponding bolts to retain the first and second portions of the rocker arm in an operative position (following positioning of a drive shaft as described herein). In exemplary aspects, the second portion of the rocker arm 106 can define a plurality of outer notches 132 in communication with the plurality of bores and configured to receive a head of a corresponding bolt. In further exemplary aspects, it is contemplated that the drive link system 100 can comprise a plurality of snap rings positioned within the plurality of notches and configured to receive a respective bolt of the plurality of bolts.

In exemplary aspects, the first and second pins 102, 103 can have a length of about 5 inches and a diameter of about 0.5 inches. However, it is contemplated that pins having any suitable dimensions can be used, provided that the pins have sufficient length to extend through the aligned bores of the goose-neck 104, rocker arm 106, and drive links 108 disclosed herein. It is further contemplated that the diameter of the pins 102, 103 can substantially conform to the operative diameter of the bores 110, 111 of the goose-neck, rocker arm, drive links, and/or bearings 112 so as to minimize movement of the pin relative to the other components of the drive link system 100. It is still further contemplated that the first and second pins 102, 103 can have a length that is greater than the length of conventional dowel pins, which only extend through a single drive link.

In further exemplary aspects, it is contemplated that at least one of (a) the rocker arm 106 and (b) the plurality of drive links 108 can comprise a light-weight metal, such as, for example and without limitation, aluminum and, more particularly, aircraft aluminum. In these aspects, it is contemplated that, for a tufting machine comprising twelve drive link systems with aluminum rocker arms and drive links as described herein, a weight reduction of over 100 pounds can be achieved when compared to conventional cast steel rocker arms and drive links. Although the rocker arm 106 and drive links are described herein as comprising aluminum, it is contemplated that any light-weight material that is capable of reducing the weight of the drive link system 100 (as compared to conventional steel drive link systems) and that is capable of withstanding the operating conditions of the tufting machine can be used. For example, in exemplary aspects, it is contemplated that the rocker arms and drive links can comprise titanium.

It is contemplated that the drive link systems disclosed herein can be used as replacements for the drive link systems of conventional tufting machines, such as, for example and without limitation, the "SUPERSPEED" and "CONCEPT 2003" tufting machines manufactured by Card-Monroe Corporation (Hixson, Tenn.). It is further contemplated that the existing goose-necks of conventional tufting machines can be used in conjunction with the other elements of the disclosed drive link systems to achieve the benefits described herein.

The present invention can thus be embodied in other specific forms without departing from its spirit or essential characteristics. The described aspects are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A drive link system for use in a tufting machine, comprising:
   a goose-neck defining first and second spaced projections, each projection having an outer surface and an inner surface, the inner surfaces of the projections cooperating to define a receiving space, each projection of the first and second spaced projections defining a bore, the respective bores of the spaced projections being substantially axially aligned;
   a rocker arm defining first and second spaced projections, each projection having an outer surface and an inner surface, the inner surfaces of the projections cooperating to define a receiving space, each projection of the first and second spaced projections defining a bore, the respective bores of the spaced projections being substantially axially aligned, the first and second spaced projections of the rocker arm being positioned in substantial opposition to the first and second spaced projections of the goose-neck;
   a first pin configured for receipt within the bores of the projections of the goose-neck;
   a second pin configured for receipt within the bores of the projections of the rocker arm; and
   a plurality of drive links, each drive link of the plurality of drive links defining a pair of first and second spaced bores positioned on opposing first and second ends of the drive link, the plurality of drive links comprising:
      an inner drive link having its first end positioned within the receiving space of the goose-neck and its second end positioned within the receiving space of the rocker arm such that the first and second bores of the inner drive link are substantially axially aligned with the bores of the projections of the goose-neck and the rocker arm, wherein the first bore of the inner drive link is configured to receive the first pin, and wherein the second bore of the inner drive link is configured to receive the second pin; and
      first and second outer drive links, the first outer drive link being positioned substantially adjacent to the outer surfaces of the first projections of the goose-neck and the rocker arm such that the first and second bores of the first outer drive link are substantially axially aligned with the bores of the first projections of the goose-neck and the rocker arm, the second outer drive link being positioned substantially adjacent to the outer surfaces of the second projections of the goose-neck and the rocker arm such that the first and second bores of the second outer drive link are substantially axially aligned with the bores of the second projections of the gooseneck and the rocker arm, wherein the first bores of the outer drive links are configured to receive the first pin, and wherein the second bores of the outer drive links are configured to receive the second pin.

2. The drive link system of claim 1, further comprising:
   a plurality of oil-impregnated bearings, each bearing being received within a respective bore of a drive link of the plurality of drive links.

3. The drive link system of claim 2, wherein each bearing of the plurality of bearings is configured to receive a respective pin of the first and second pins.

4. The drive link system of claim 1, wherein the plurality of drive links comprise aluminum.

5. The drive link system of claim 1, wherein each of the pair of pins has a length of about 5 inches.

6. The drive link system of claim 1, wherein each of the pair of pins has a diameter of about 0.5 inches.

7. The drive link system of claim 1, wherein the plurality of drive links comprise titanium.

8. The drive link system of claim 1, wherein the rocker arm comprises titanium.

9. The drive link system of claim 1, wherein the plurality of drive links are substantially equally spaced.

10. The drive link system of claim 1, wherein the plurality of drive links are substantially parallel.

11. A tufting machine, comprising:
    a drive link system having:
       a goose-neck defining first and second spaced projections, each projection having an outer surface and an inner surface, the inner surfaces of the projections cooperating to define a receiving space, each projection of the first and second spaced projections defining a bore, the respective bores of the spaced projections being substantially axially aligned;

a rocker arm defining first and second spaced projections, each projection having an outer surface and an inner surface, the inner surfaces of the projections cooperating to define a receiving space, each projection of the first and second spaced projections defining a bore, the respective bores of the spaced projections being substantially axially aligned, the first and second spaced projections of the rocker arm being positioned in substantial opposition to the first and second spaced projections of the goose-neck;

a first pin configured for receipt within the bores of the projections of the goose-neck;

a second pin configured for receipt within the bores of the projections of the rocker arm; and a plurality of drive links, each drive link of the plurality of drive links defining a pair of first and second spaced bores positioned on opposing first and second ends of the drive link, the plurality of drive links comprising:

an inner drive link having its first end positioned within the receiving space of the goose-neck and its second end positioned within the receiving space of the rocker arm such that the first and second bores of the inner drive link are substantially axially aligned with the bores of the projections of the goose-neck and the rocker arm, wherein the first bore of the inner drive link is configured to receive the first pin, and wherein the second bore of the inner drive link is configured to receive the second pin; and first and second outer drive links, the first outer drive link being positioned substantially adjacent to the outer surfaces of the first projections of the goose-neck and the rocker arm such that the first and second bores of the first outer drive link are substantially axially aligned with the bores of the first projections of the goose-neck and the rocker arm, the second outer drive link being positioned substantially adjacent to the outer surfaces of the second projections of the goose-neck and the rocker arm such that the first and second bores of the second outer drive link are substantially axially aligned with the bores of the second projections of the goose-neck and the rocker arm, wherein the first bores of the outer drive links are configured to receive the first pin, and wherein the second bores of the outer drive links are configured to receive the second pin.

12. The tufting machine of claim 11, wherein the drive link system further comprises:

a plurality of oil-impregnated bearings, each bearing being received within a respective bore of a drive link of the plurality of drive links.

13. The tufting machine of claim 12, wherein each bearing of the plurality of bearings is configured to receive a respective pin of the first and second pins.

14. The tufting machine of claim 11, wherein the plurality of drive links are substantially equally spaced.

15. The tufting machine of claim 11, wherein the plurality of drive links are substantially parallel.

* * * * *